June 21, 1927.
F. H. SCHOELERMAN
1,633,497
LUGGAGE CARRIER
Filed Nov. 22, 1926
3 Sheets-Sheet 1
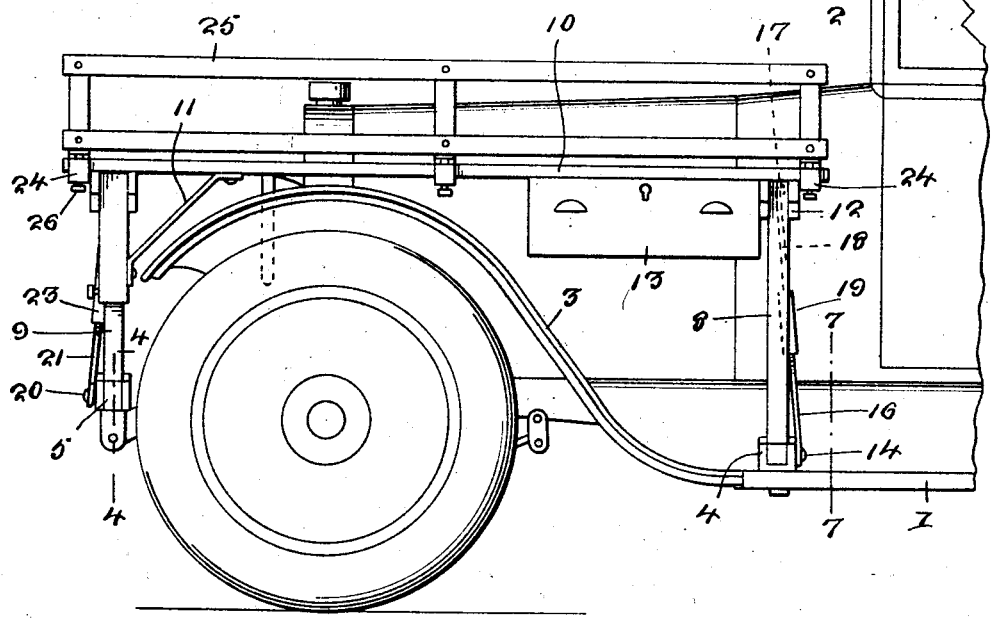
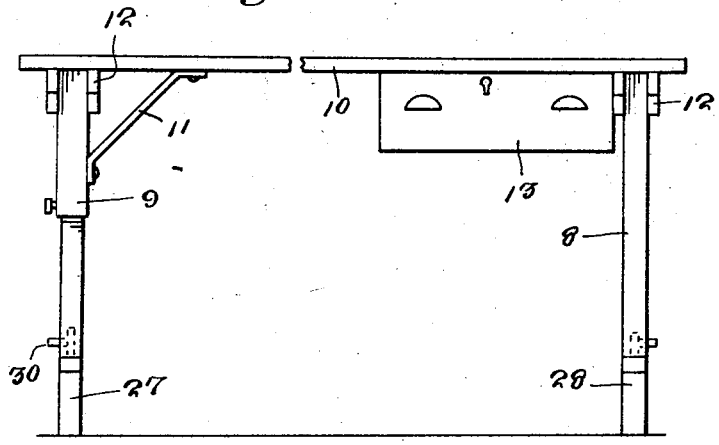
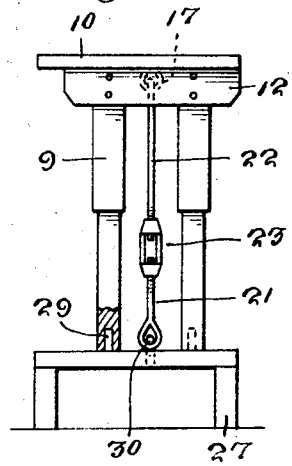
F.H. Schoelerman
INVENTOR
BY Victor J. Evans
ATTORNEY June 21, 1927.
F. H. SCHOELERMAN
LUGGAGE CARRIER
Filed Nov. 22, 1926
1,633,497
3 Sheets-Sheet 2
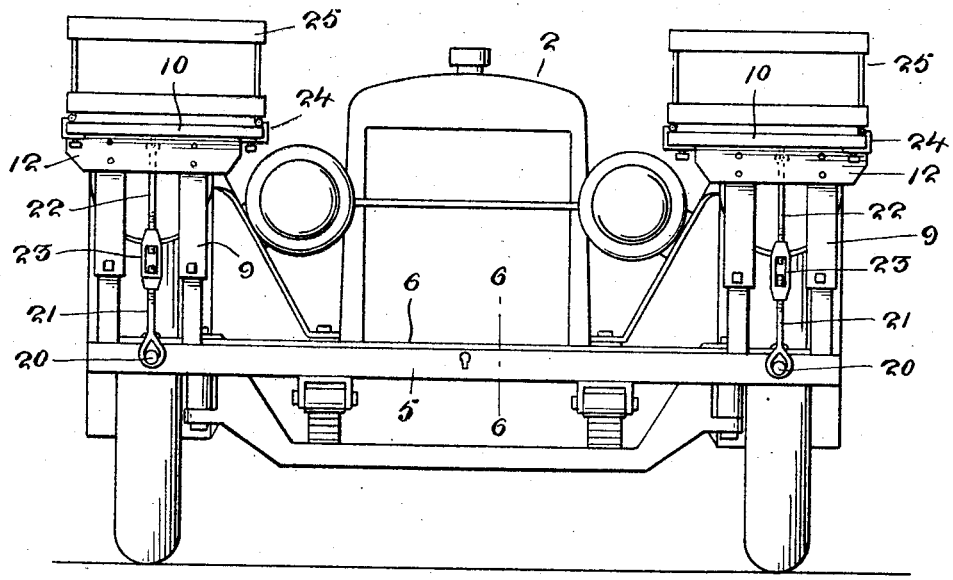
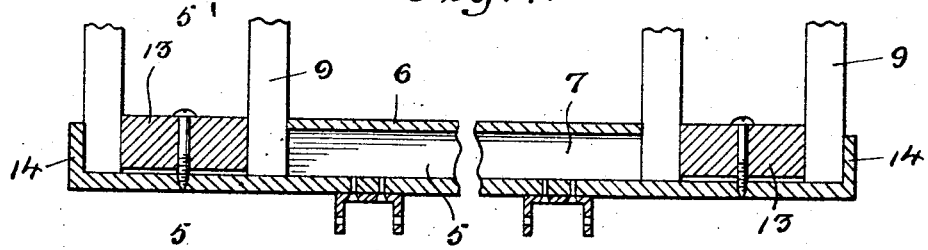
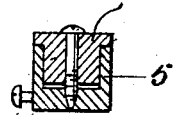 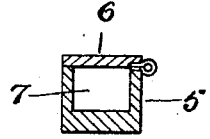
F.H. Schoelerman
INVENTOR
BY Victor J. Evans
ATTORNEY June 21, 1927.
F. H. SCHOELERMAN
LUGGAGE CARRIER
Filed Nov. 22, 1926
1,633,497
3 Sheets-Sheet 3
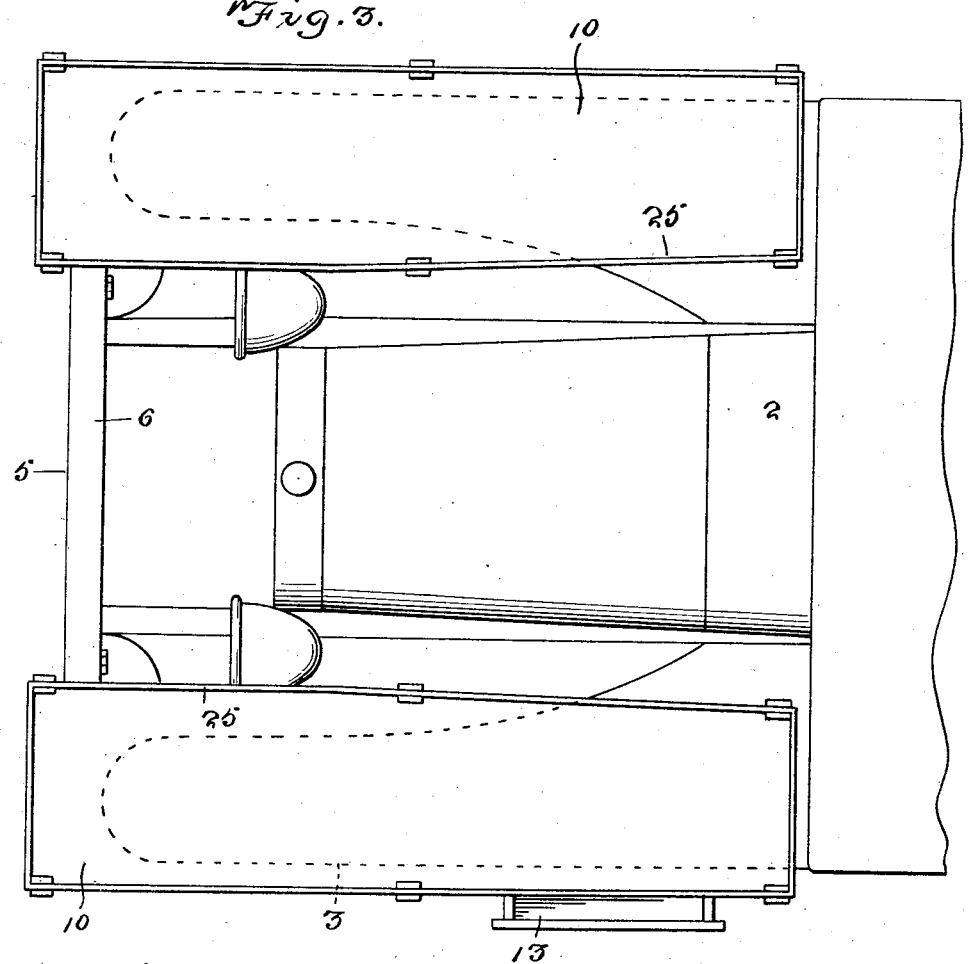
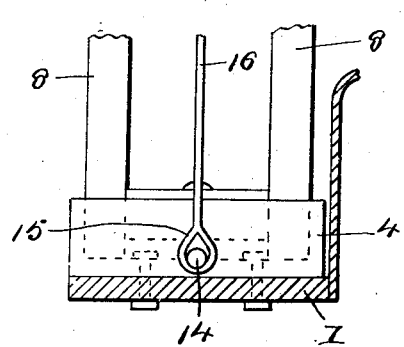
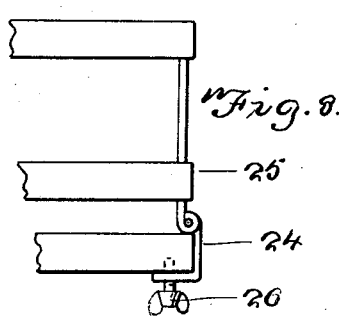
F.H. Schoelerman
INVENTOR
BY Victor J. Evans
ATTORNEY Patented June 21, 1927.

1,633,497

UNITED STATES PATENT OFFICE.

FERDINAND H. SCHOELERMAN, OF KEYSTONE, IOWA.

LUGGAGE CARRIER.

Application filed November 22, 1926. Serial No. 150,010.

My present invention has reference to a new and novel luggage carrier for automobiles. Luggage carriers commonly employed in connection with automobiles are bolted or otherwise removably secured to one of the running boards of the machine. This not only adds weight to the side of the machine upon which the luggage is positioned but prevents the opening of the doors of the machine adjacent thereto. The luggage packed in such devices frequently projects therebeyond, and is liable to contact by passing machines and is also liable to become lost. Therefore, I aim to provide a luggage carrier which is arranged over the front mud-guards of an automobile so that the weight will be evenly distributed, but wherein the construction is such as to not interfere with the vision of the driver, the radiator or the raising and lowering of the hood so that the car may be supplied with oil and water when the device is in place, and also wherein the luggage carried by the improvement will not be projected beyond the sides of the automobile.

A further object is the provision of a device for this purpose which not only serves as a carrier for luggage but also provides tables which can be easily removed from the machine and set up on the ground when desired for dining or other purposes and further wherein a comparatively large number of articles in addition to luggage may be conveniently conveyed.

A still further object is to arrange tables of a novel construction over the front mud guards of an automobile, to removably clamp the same thereon in a novel and effective manner so that said tables are prevented from rattling or displacement, while on each of the tables I clamp a removable frame in the nature of a luggage carrier, and whereby not only the luggage rests upon the tables but the drawers thereof serve as containers for dishes, kitchen utensils, etc., while further the supporting means for the table provide a receptacle for other articles.

To the attainment of the above broadly recited objects and others which will present themselves as the nature of the invention is better understood, the improvement resides in the construction, combination and operative association of parts, a satisfactory embodiment of which is disclosed by the accompanying drawings.

In the drawings:

Figure 1 is a side elevation of a sufficient portion of an automobile to illustrate the application of my improvement thereon.

Figure 2 is a front elevation thereof.

Figure 3 is a top plan view thereof.

Figure 4 is a sectional view approximately on the line 4—4 of Figure 1.

Figure 5 is a sectional view approximately on the line 5—5 of Figure 4.

Figure 6 is a sectional view approximately on the line 6—6 of Figure 2.

Figure 7 is a sectional view approximately on the line 7—7 of Figure 1.

Figure 8 is a fragmentary elevation to illustrate the manner in which the frame is removably clamped on the table top.

Figure 9 is a side elevation to illustrate the table removed from the automobile and set up for service.

Figure 10 is an end view of the device illustrated in Figure 9 with parts in section.

On each of the running boards 1 of an automobile 2, directly to the rear of the front mud guards 3, I secure a transversely arranged channeled member 4.

To the front ends of the frame of the automobile, or if desired, to the top of the front bumper of the machine, I secure a hollow member 5 of a length approximately equaling the distance between the outer edges of the mud guard 3. The hollow member 5 has an open top and is centrally provided with a door plate 6 that is hinged thereto and that may be locked thereon, so that the central portion of the said hollow member provides a compartment 7 for tent pegs or for other articles desired by the tourists or campers using the automobile.

Adapted to be received in the channeled members or blocks 4 and in the hollow member 5 are the rear and front pairs of legs 8 and 9 of the table members. Preferably both the front and rear legs provide adjustable sections which are telescopically associated and the front legs 9 show such construction. As the mud guards of different types of cars vary in height with respect to the ground surface the desirability of having the legs adjustable will be apparent. The legs have secured thereon a top 10. The rear legs are arranged closer together than the front legs and the top has its sides preferably inclined from its front to its rear. This is especially true with respect to the inner side or edge of the table top 10. Suitable brace means 11 are provided between the front legs and the top 10 and transverse brace elements 12 are arranged between the table top and both sets of legs. Beneath the top 10 of each of the tables there is a slidable drawer 13 and these drawers are normally locked. The drawers are designed for the reception of kitchen utensils, such as knives, forks, spoons or the like.

When the table legs are arranged in the members 4 and 5, suitable removable blocks 13 are inserted in these members for contacting with the confronting sides or faces of the table legs and for also forcing the said legs into contact with the closed ends 14 of the member 5. If desired, the ends of the member 4 may be also closed and the rear legs forced into contact with these ends by the said blocks 13.

On the rear or outer face of the members 4 there are headed studs 14 to engage with eyes 15 on the ends of rods 16. Removably fixed, as at 17, to the under face of each of the table tops at the rear thereof, there is a depending rod 18. The rods 16 and 18 have their ends threaded at opposite hand pitches and are engaged by a turn-buckle 19. By adjusting the turn-buckle it will be seen that the rear of the table will be held from vertical movement on the machine. The hollow member 5, adjacent to the ends thereof, has secured thereon outstanding headed studs 20 for the reception of the eye ends of rods 21 similar to the rods 16, and the front of the tables have removably secured thereon depending rods 22. The confronting ends of the rods 21 and 22 are threaded at different hand pitches and are engaged by turn-buckles 23. By adjusting the turn-buckles the front of the tables will be effectively held from vertical movement, and by turning both series of turn-buckles in a reverse direction the tables can be removed from the machine.

Removably secured by clamps 24 on the table tops there are open frames 25. These frames provide the luggage carrier. The clamps 24 have associated therewith binding elements 26 so that the luggage carriers are effectively supported upon the table tops and likewise the said luggage carriers may be removed from the tables when the tourists have reached their camping grounds and the tables are employed for culinary or other purposes.

When the rear legs of the tables are not adjustable the same when arranged on the machine, are necessarily of a greater length than the front legs, and in order that the tables may properly rest on a ground surface I provide front and rear substantially U-shaped supports 27 and 28, respectively.

These supports have their upper elements provided with outstanding pins 29 that are received in sockets in the table legs and intermediate of the pins the said supports are provided with angle elements or hooks 30 for the reception of the eyes of the rods 21 and 16, and the turn-buckles connecting the adjustable rods are adjusted to firmly clamp the legs on the supports. The rear support is of a greater height than the front support, as clearly disclosed by Figure 9 of the drawings.

The simplicity of my improvement and the advantages thereof will, it is thought, be perfectly apparent to those skilled in the art to which such invention relates after the foregoing description has been carefully read in connection with the accompanying drawings, but obviously I do not wish to be restricted to the precise structural details herein set forth and therefore hold myself entitled to make such changes therefrom as fairly fall within the scope of what I claim.

Having described the invention, I claim:

The combination with the front portion of an automobile, of channel members secured on the running board adjacent to the front mud guards of the automobile, a hollow member fixedly supported to and extending beyond the front of the automobile, said channel and hollow members designed to receive therein the legs on tables which are arranged over the front mud guards, removable and adjustable means securing the tables on the said members, blocks secured in the said members and contacting with the confronting sides of the table legs, and a hinged cover for the top of the hollow member swingable between and contactable with the outer legs of the respective tables, in combination with a removable luggage carrier for the tables.

In testimony whereof I affix my signature.

FERDINAND H. SCHOELERMAN.